United States Patent
Yamamoto et al.

(10) Patent No.: US 7,210,750 B2
(45) Date of Patent: May 1, 2007

(54) CRAWLER BELT LINK GRINDING SYSTEM AND CRAWLER STRUCTURE

(75) Inventors: Teiji Yamamoto, Kadoma (JP); Kazuo Maeda, Hirakata (JP)

(73) Assignee: Komatsu Ltd., Tokyo (JP)

( * ) Notice: Subject to any disclaimer, the term of this patent is extended or adjusted under 35 U.S.C. 154(b) by 67 days.

(21) Appl. No.: 10/797,686

(22) Filed: Mar. 9, 2004

(65) Prior Publication Data

US 2005/0040706 A1   Feb. 24, 2005

(30) Foreign Application Priority Data

Mar. 19, 2003   (JP)   ............... 2003-076164
Nov. 17, 2003   (JP)   ............... 2003-386281

(51) Int. Cl.
*B60S 1/62*      (2006.01)
*B62D 55/14*   (2006.01)
*B62D 25/16*   (2006.01)

(52) U.S. Cl. .................. 305/110; 305/126; 305/107

(58) Field of Classification Search ............... 305/139, 305/100, 107, 109–112, 115, 124, 126, 127; 180/9.54, 9.56; 280/5.22; 104/279
See application file for complete search history.

(56) References Cited

U.S. PATENT DOCUMENTS

| | | | | |
|---|---|---|---|---|
| 1,660,100 A | * | 2/1928 | Smyth | 305/139 |
| 1,660,103 A | * | 2/1928 | Smyth | 305/108 |
| 1,660,105 A | * | 2/1928 | Smyth | 305/120 |
| 1,946,660 A | * | 2/1934 | Baker | 305/139 |
| 2,535,254 A | * | 12/1950 | Attwell | 180/9.22 |
| 3,053,334 A | * | 9/1962 | Bauer | 180/9.1 |
| 3,100,629 A | * | 8/1963 | Moon | 299/58 |
| 3,554,310 A | * | 1/1971 | Dieffenbach | 180/9.23 |
| 3,841,717 A | * | 10/1974 | Parisotto et al. | 305/127 |
| 6,758,145 B1 | * | 7/2004 | Hefter | 104/279 |
| 2002/0005665 A1 | * | 1/2002 | Ito et al. | 305/110 |

FOREIGN PATENT DOCUMENTS

JP   1-125286 U   8/1989
JP   H01-125286 U   8/1999

* cited by examiner

*Primary Examiner*—Jason R. Bellinger
(74) *Attorney, Agent, or Firm*—Frishauf, Holtz, Goodman & Chick, P.C.

(57) ABSTRACT

Vibration or the like is prevented for long-term use by normalizing, with operation continuing, a tread of a crawler belt link through grinding in an early stage where uneven wear such as corrugated wear occurs. With a crawler belt of a crawler vehicle wound, an abrasive plate for grinding the tread of the crawler belt link is disposed to contact the tread. While the crawler vehicle does normal traveling work, the abrasive plate corrects the tread of the crawler belt link for the uneven wear. The vibration of a vehicle body can thus be prevented during travel with no uneven wear produced.

17 Claims, 13 Drawing Sheets

FIG. 9
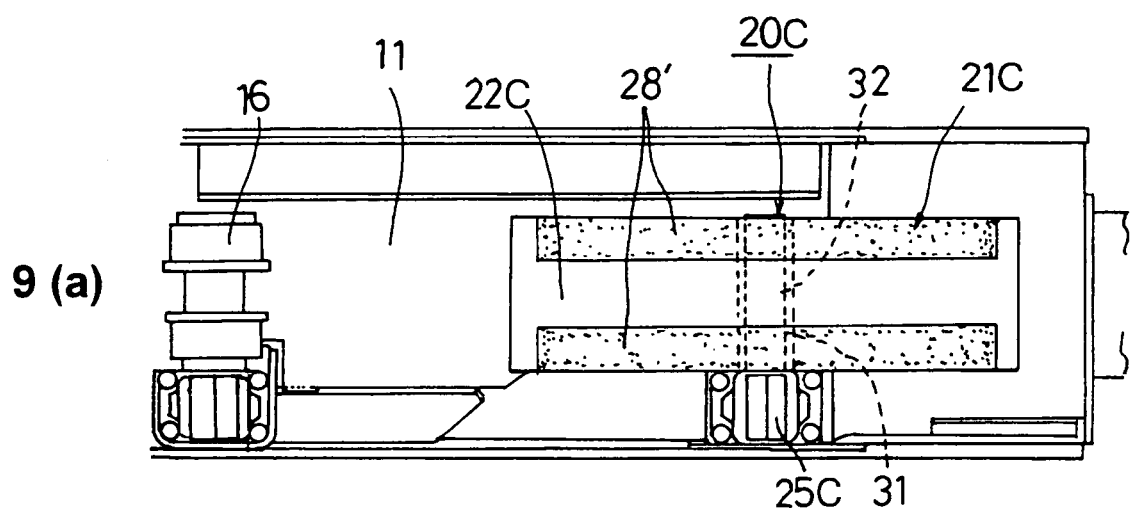
9 (a)
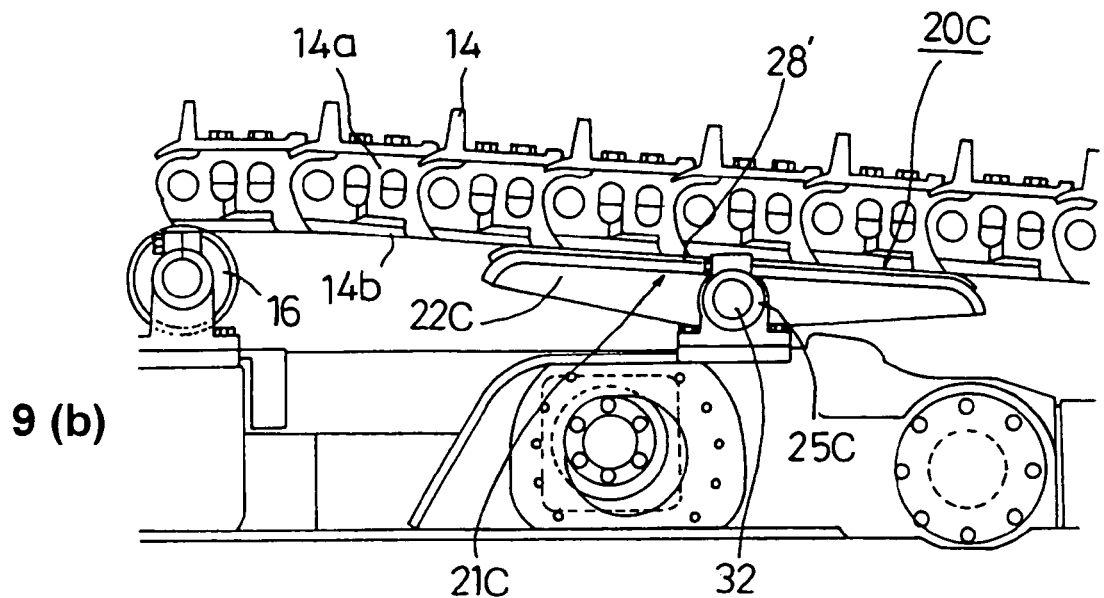
9 (b)

FIG. 13
PRIOR ART
13 (a)
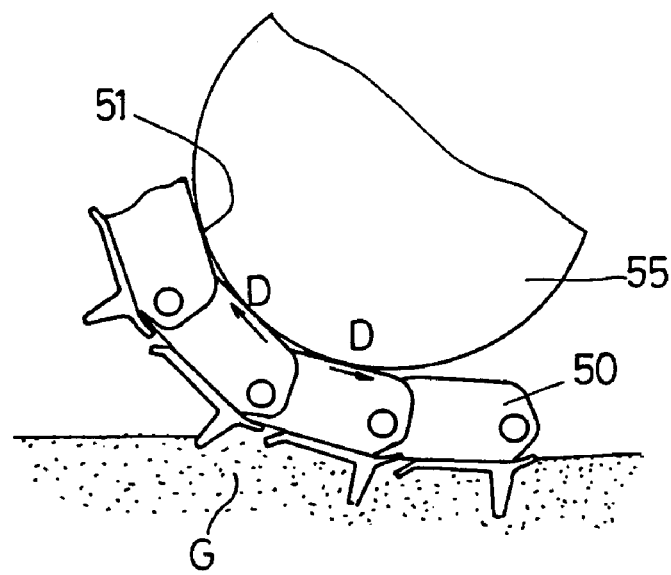
13 (b)
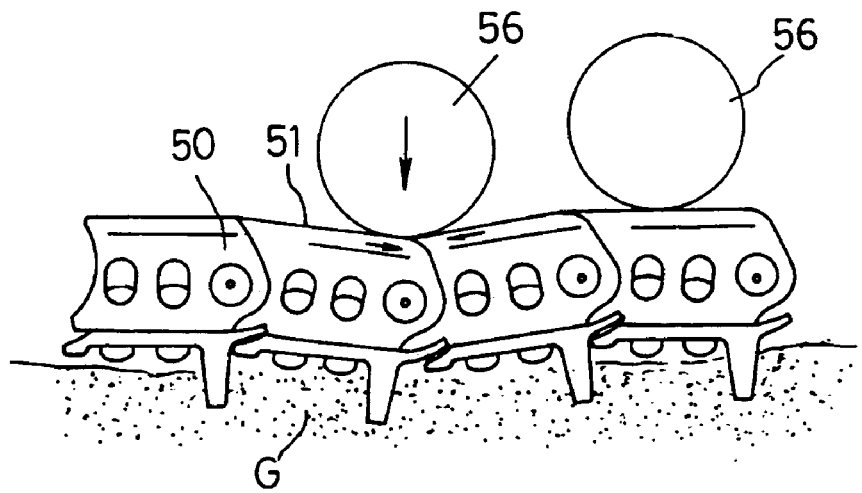
13 (c)
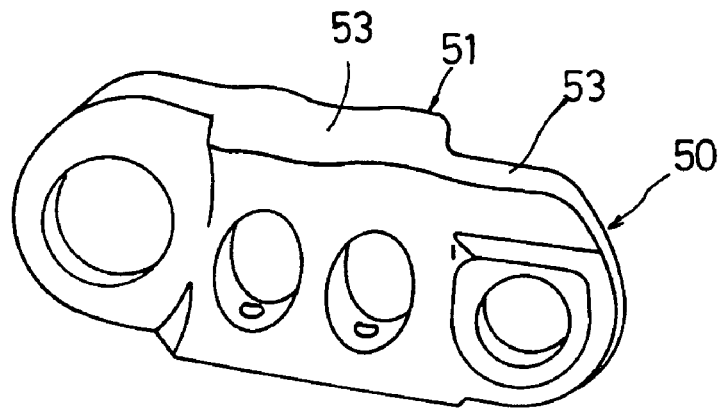

CRAWLER BELT LINK GRINDING SYSTEM AND CRAWLER STRUCTURE

FIELD OF THE INVENTION

The present invention relates to a crawler belt link grinding system and a crawler structure including the grinding system that find use in a crawler type work vehicle having its lower structure equipped with a crawler belt, such as construction equipment including a hydraulic excavator and a bulldozer or other industrial equipment.

BACKGROUND ART

In a conventional crawler structure of a crawler type work vehicle, a traveling crawler belt is formed of crawler belt links wound endlessly between a sprocket and an idler that are disposed in respective rear and front positions of a main frame. This crawler belt is held by a plurality of track rollers on a ground-contact side, is held by carrier rollers on a non-ground-contact side to maintain uniform tension and is driven by being wound around a sprocket member of the sprocket.

In such a crawler structure, when a tread of the crawler belt link is in rolling contact with the track roller, the carrier roller or the idler during travel, the tread wears down unevenly, thus showing corrugated wear. Such uneven wear is caused, for example, during travel on soft ground G as shown in FIG. 13(a). Since soft ground G easily causes sinking, earth and sand easily adhere to the crawler belt. The earth and sand adhere between tread 51 of crawler belt link 50 and idler 55, thus causing the wear when tread 51 slides in surface D of contact with idler 55. Moreover, as shown in FIG. 13(b), when ground G is soft enough to easily cause sinking as in the above case, the earth and sand adhere to respective ends of treads 51 of crawler belt links 50 at track roller 56, thus causing the wear during slide. Briefly speaking, traveling on the soft ground quite often causes the part contacting idler 55 or track roller 56 to show severe partial wear because crawler belt 52 sinks easily, and consequently, tread 51 of crawler belt link 50 shows corrugated wear 53 as illustrated in FIG. 13(c). A high degree of corrugated wear results in vibration of a vehicle body during travel on a stable hard road, and when the corrugated wear becomes noticeable, noise is caused, thus adversely affecting an environment. Accordingly, the link must be replaced when tread 51 of crawler belt link 50 shows the severe corrugated wear, and such replacement reduces cost efficiency.

For solving the problem of wear of the crawler belt link, no concrete means is proposed. A known measure against the wear of the crawler belt link is disclosed, for example, in Japanese Utility Model Unexamined Publication No. H01-125286. According to this publication, a flange of the track roller is ground according to wear of the tread of a track link (crawler belt link) at the track roller. The flange is thus prevented from contacting a connecting pin boss of the track link, whereby the use of the crawler belt link is extended.

However, the measure disclosed in Japanese Utility Model Unexamined Publication No. H01-125286 is not a technique adapted to solve the problem that is addressed by the present invention because this measure is based on the assumption that the link shows overall wear. This measure solves problem that only the initial flange maintains its size as a result of the tread showing the wear at the roller where relative wear is caused, by grinding the flange according to the wear of the tread. As described earlier, no measure against the corrugated wear or uneven wear of the crawler belt link is found, so that there is no other choice but to replace the link. Accordingly, the reduction of running costs remains unattained under present circumstances.

In view of such circumstances, the present invention aims to provide a crawler belt link grinding system and a crawler structure including the grinding system that allow a tread to withstand long-term use by normalizing, with operation continuing, the tread through grinding in an early stage where uneven wear such as corrugated wear occurs.

SUMMARY OF THE INVENTION

To achieve the object described above, a crawler belt link grinding system of the present invention includes:

an abrasive plate for grinding a tread of a crawler belt link, the abrasive plate being disposed to contact the tread with a crawler belt of a crawler structure wound.

According to the present invention, while a crawler vehicle does normal traveling work, the abrasive plate corrects the tread of the crawler belt link for uneven wear. Vibration of a vehicle body can thus be prevented during travel with no uneven wear produced, and durability of the crawler belt can be maintained.

In the present invention, the abrasive plate is disposed above a track frame. Thus, the abrasive plate can secure its position for mounting with ease, and detachment and adjustment to the position are facilitated.

In the invention, the abrasive plate may be disposed below a rear portion of the track frame and supported by a support member added to a bogie supporting a track roller, or may be supported by the support member, which is added to the rear portion of a bottom side of the track frame. Consequently, grinding can be performed even on a ground-contact side of the crawler belt, the detachment of the abrasive plate and the adjustment to the position of the abrasive plate are possible, and the crawler belt links can be prevented from rising during travel.

In the invention, it is preferable that the abrasive plate mounted can be detached or withdrawn from a grinding position. When replacement or grinding is not required of the abrasive plate, the abrasive plate can be removed or moved away from a position of contact with the crawler belt link, so that needless wear and an increase in resistance can be prevented.

Moreover, the abrasive plate disposed has an adjustable setting position. Adjusting the abrasive plate to an optimum position for grinding before use can shorten a period of time during which the abrasive plate is used, thus achieving a desired object, and can prevent the needless wear and the increase in resistance that is associated with the grinding.

Preferably, the abrasive plate of the present invention includes an abrasive surface including an abrasive disposed thereon, and the abrasive surface is provided to contact at least one of the crawler belt links in parallel with the crawler belt link. Adopting such a structure allows smooth grinding for normalizing the tread of the crawler belt link and prevents irregular wear of the abrasive surface of the abrasive plate, thus extending the life of the abrasive plate.

A crawler structure of the present invention includes:

an endless crawler belt wound between a sprocket and an idler of a crawler vehicle; and a crawler belt link grinding system for grinding a tread of a crawler belt link of the crawler belt.

According to this invention, the tread of the crawler belt link is automatically ground by the crawler belt link grinding system during travel of the vehicle that is effected by driving the crawler structure. Since the crawler belt link is driven so as not to have the uneven wear, the vibration is suppressed, whereby smooth travel is secured.

In this invention, it is preferable that the crawler belt link grinding system is supported at a track frame and grinds the tread of the crawler belt link on at least one of a non-ground-contact side and a ground-contact side of the crawler belt. The incorporation of the crawler belt link grinding system is thus rationalized, so that the crawler belt wound can have the tread of its link ground in the process of being driven, while the vehicle is in operation. Consequently, the uneven wear can be corrected for in a short time, and the crawler belt can be driven normally. In this way, trouble resulting from the uneven wear is prevented with ease.

In this invention, the crawler belt link grinding system preferably includes an abrasive plate formed to have a flat abrasive surface. With this structure, the tread of the crawler belt link that comes into contact with the abrasive plate is always corrected to have a flat surface, thereby being prevented from having the uneven wear.

BRIEF DESCRIPTION OF THE DRAWINGS

FIGS. 9(a) and 9(b) are respective top plan and side views of a crawler belt link grinding system in accordance with a fifth exemplary embodiment of the present invention.

FIGS. 13(a), 13(b) and 13(c) illustrate a phenomenon leading to corrugated wear of a conventional crawler belt link, and FIGS. 13(a) and 13(b) illustrate respective parts contacting an idler and a track roller, respectively, while FIG. 13(c) illustrates the link showing the corrugated wear.

DETAILED DESCRIPTION OF THE INVENTION

Referring to the accompanying drawings, a description will be provided hereinafter of concrete exemplary embodiments of a crawler belt link grinding system and a crawler structure according to the present invention.

(FIRST EMBODIMENT)

Figure 1:
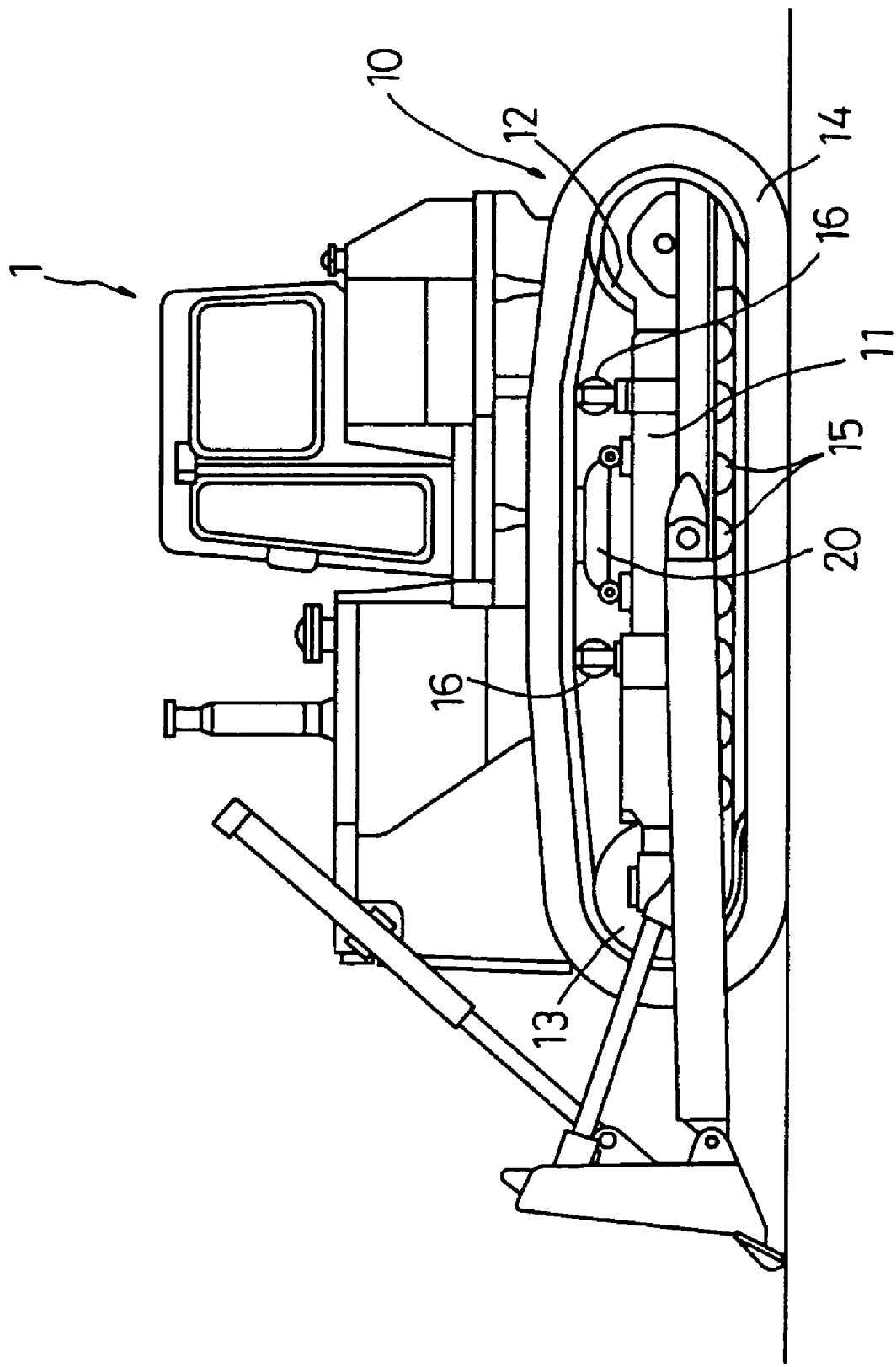
FIG. 1 is a side view of a work machine equipped with a crawler structure in accordance with a first exemplary embodiment of the present invention.
Figure 2:
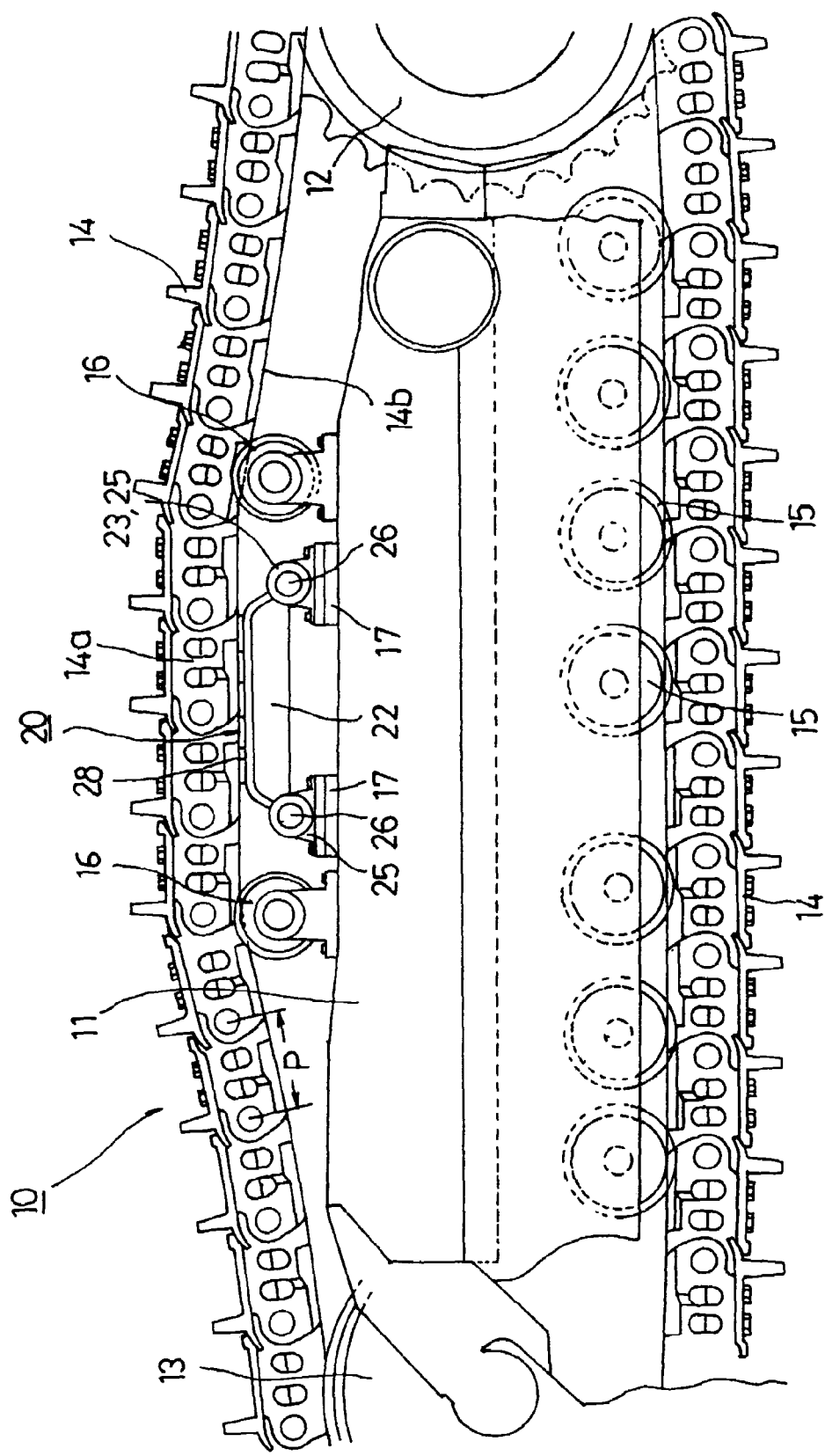
FIG. 2 is a front elevation of an essential part of the crawler structure in accordance with the first embodiment.
Figure 3:
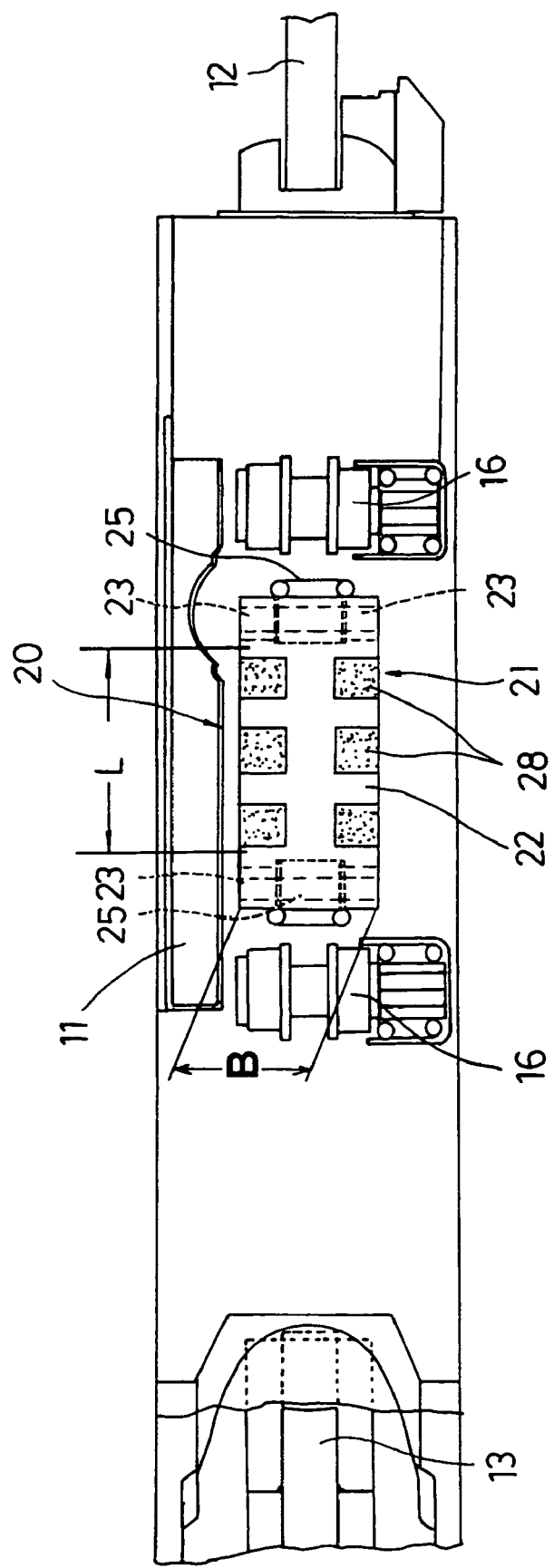
FIG. 3 is a top plan view of the essential part in FIG. 2 with an upper portion of a crawler belt removed.
Figure 4:
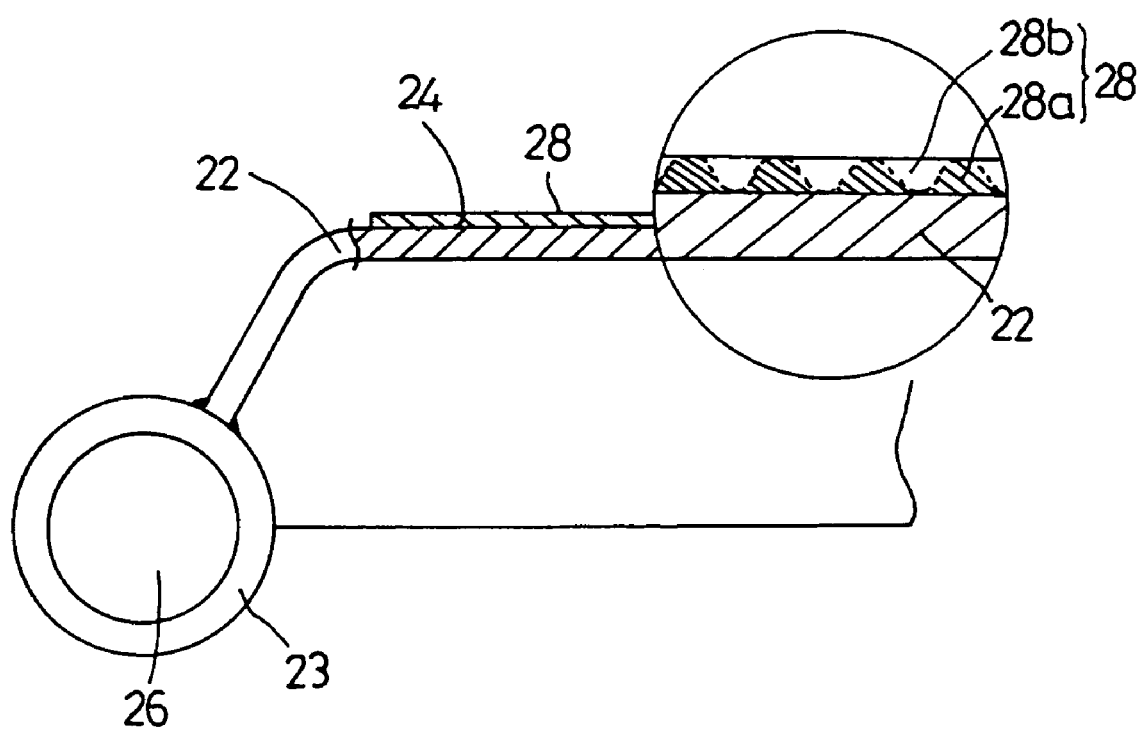
FIG. 4 is an enlarged sectional view of an essential part of an abrasive plate in accordance with the first embodiment.

FIG. 1 is a side view of a work machine equipped with a crawler structure in accordance with a first exemplary embodiment of the present invention. FIG. 2 is a front elevation of an essential part of the crawler structure in accordance with the present embodiment, and FIG. 3 is a top plan view of the essential part in FIG. 2 with an upper portion of a crawler belt removed. FIG. 4 is an enlarged sectional view of an essential part of an abrasive plate.

Crawler structure 10 of the present embodiment is used as a lower structure of work machine 1, such as a bulldozer, which travels on rough terrain for work. This crawler structure 10 is equipped with, at each side of track frame 11, endless crawler belt 14 wound between sprocket 12 and idler 13 that are disposed at respective ends of track frame 11, a plurality of track rollers 15 for maintaining contact between crawler belt 14 and the ground during travel, and carrier rollers 16 for retaining tension of crawler belt 14. Crawler structure 10 is also equipped with crawler belt link grinding system 20, supported above track frame 11, for correcting respective treads 14b of a plurality of crawler belt links 14a, which form crawler belt 14, for uneven wear.

Crawler belt link grinding system 20 is formed mainly of abrasive plate 21. This abrasive plate 21 includes base frame 22 having base end bosses 23, 23 supported by mounting brackets 25, 25 standing on respective two mounting seats 17, 17, and abrasive layers 28 formed on a top surface of base frame 22. Mounting seats 17, 17 have a required spacing and are formed along a traveling direction on a top surface of track frame 11 between carrier rollers 16, 16, which are provided along the traveling direction on the top surface of track frame 11 to have a required spacing.

Base frame 22 of abrasive plate 21 is formed to have top surface 24 having width B larger than an outside width of crawler belt links 14a and length L longer than one pitch P (which is about 1.5 in the present embodiment and is shown in FIG. 2) of crawler belt link 14a. This base frame 22 is detachably mounted by inserting mounting bracket 25, which is fixed on mounting seat 17, between base end bosses 23, 23 that are formed at each base end of frame 22 below top surface 24 and separated along the direction of the width, and inserting mounting shaft 26 through respective transverse support holes of mounting bracket 25 and base end bosses 23, 23. Top surface 24 of base frame 22 is formed integrally with abrasive layers 28. These abrasive layers 28 grind treads 14b of crawler belt links 14a in succession during travel.

Abrasive layer 28 formed on the top surface of base frame 22 has a rough surface formed by overlaying, for example, super hard material including material having cemented carbide particles dispersed therein. Abrasive layers 28 each have the form of a block having a required size. As shown in FIG. 3, these abrasive layers 28 are arranged in a right position that treads 14b of crawler belt links 14a pass. Instead of being overlaid to form an overlay, which is flat from corner to corner, the super hard material for abrasive layer 28 is preferably overlaid to form stripes crossing the traveling direction of crawler belt links 14a. Since a plurality of stripes (hills 28a) and grooves 28b alternately form abrasive layer 28 (see FIG. 4), the tread of crawler belt link 14a is ground by those hills 28a formed by overlaying, and chips are effectively discharged sideward by grooves 28b. Consequently, clogging hardly takes place.

Crawler belt link grinding system 20 thus formed is mounted at such a height for use that abrasive layers 28 formed on the top surface of abrasive plate 21 contact tread 14b of crawler belt link 14a of crawler belt 14 that moves between front and rear carrier rollers 16, 16. Abrasive layers 28 of abrasive plate 21 are disposed to be virtually parallel with a portion of crawler belt 14 that extends between front and rear carrier rollers 16, 16.

When work machine 1 travels, crawler belt 14 is driven by being wound around sprocket 12 and idler 13 and moves upwardly of track frame 11. When this crawler belt 14 passes abrasive plate 21 disposed as described earlier, tread 14b of crawler belt link 14a is ground by grazing abrasive layers 28 of crawler belt link grinding system 20 thus included in crawler structure 10 between carrier rollers 16, 16. Since tread 14b of crawler belt link 14a grazes against abrasive layer 28 while moving, tread 14b is not ground hard. This graze is repeated, whereby the uneven wear is prevented. In the place where abrasive plate 21 is disposed, crawler belt links 14a are substantially held under tension by carrier rollers 16, 16 and come into contact with abrasive layers 28 extending along a distance more than one pitch of crawler belt link 14a, so that treads 14b are always kept flat for grinding when passing the abrasive parts. In this way, treads 14b become flattened. Accordingly, crawler belt link 14a can be prevented from developing partial wear conventionally caused by contact with idler 13 or track roller 15 during travel on the soft ground. Consequently, corrugated wear (uneven wear), which results in vibration of a vehicle body or noise, can be eliminated.

Crawler belt link grinding system 20 of the present embodiment can basically be detached from track frame 11. In cases where no grinding is required, abrasive plate 21 may be removed for storage by pulling out mounting shaft 26, which is inserted through mounting bracket 25 and base end bosses 23 for support. This prevents needless wear of tread 14b of crawler belt link 14a and an increase in resistance that is associated with grinding, and allows grinding only when necessary.

(SECOND EMBODIMENT)

Figure 5:
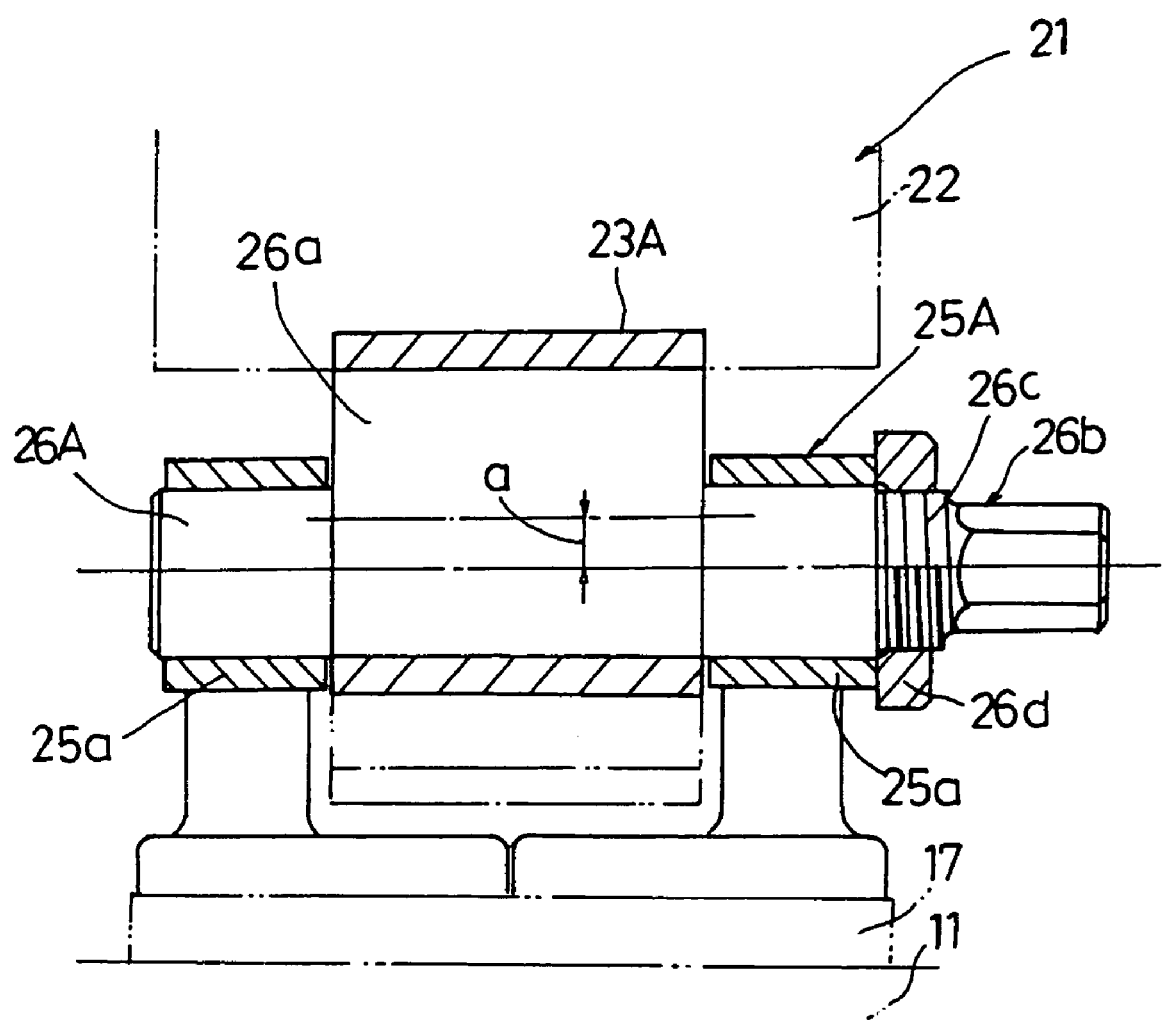
FIG. 5 is a sectional view of a mounting part for an abrasive plate in accordance with a second exemplary embodiment of the present invention.

FIG. 5 is a sectional view of a mounting part for an abrasive plate in accordance with a second exemplary embodiment of the present invention.

In the present embodiment, when no grinding using abrasive plate 21 is required, the removal of abrasive plate 21 that is described earlier is replaced by the use of mounting shaft 26A with an eccentric structure as a mounting shaft passing through a base end boss of base frame 22 and shaft support bosses of a mounting bracket. In other words, the following structure is adopted. Mounting bracket 25A is formed to fork into two shaft support bosses 25a, and base end boss 23A of base frame 22 is inserted between these shaft support bosses 25a, 25a of mounting bracket 25A. Mounting shaft 26A has an intermediate section having the eccentric structure, and this eccentric section 26a of mounting shaft 26A is inserted into a shaft hole of base end boss 23A for support. By displacing eccentric section 26a through rotation of mounting shaft 26A, the amount of eccentricity a is increased, whereby abrasive plate 21 can be moved vertically by an amount which is twice the amount of eccentricity a. Under normal conditions, abrasive plate 21 is used by setting eccentric section 26a, for example, between a neutral height position and a highest position. Abrasive plate 21 can be put out of use by displacing eccentric section 26a to a lowest position through rotation for bringing abrasive layer 28 out of contact with tread 14b of crawler belt link 14a.

With the use of mounting shaft 26A provided with such an eccentric section 26a, the height can be adjusted easily by rotating mounting shaft 26A even when an adjustment is made to the contact between abrasive layer 28 of abrasive plate 21 and tread 14b of crawler belt link 14a. To facilitate the rotation, the following structure is adopted as an example. Mounting shaft 26A is formed to have hexagonal shaft end part 26b, which is somewhat long. Torque is transmitted with a wrench. Shaft end part 26b is partly provided with threaded part 26c, and lock nut 26d is screwed onto threaded part 26c. This nut 26d can be locked by being brought into contact with an outer end face of shaft support boss 25a of mounting bracket 25A. With this structure, a rotation angle of mounting shaft 26A can be decided arbitrarily. Such operation can be done outside track frame 11, so that the work is facilitated.

(THIRD EMBODIMENT)

Figure 6:
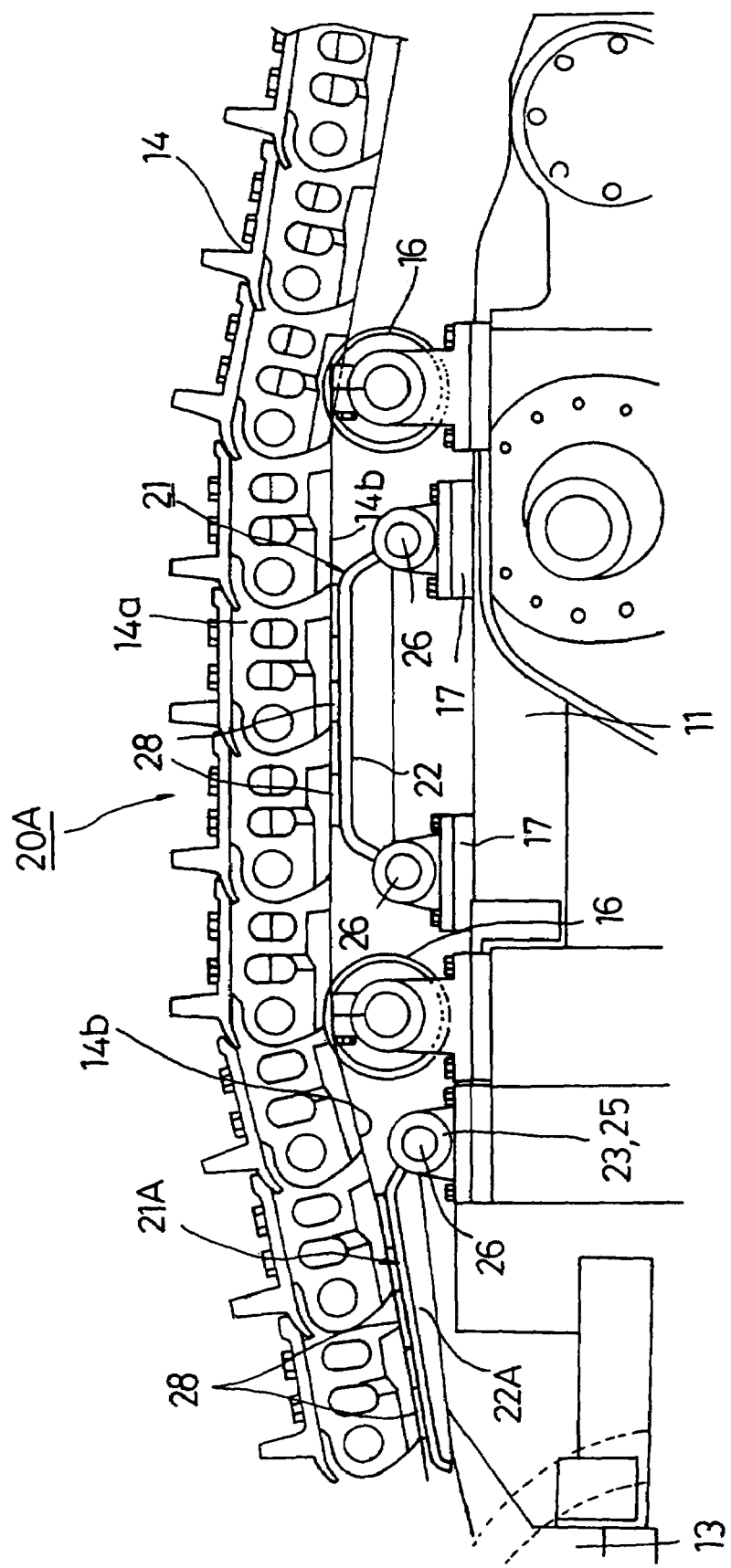
FIG. 6 is a side view of a crawler belt link grinding system in accordance with a third exemplary embodiment of the present invention.
Figure 7:
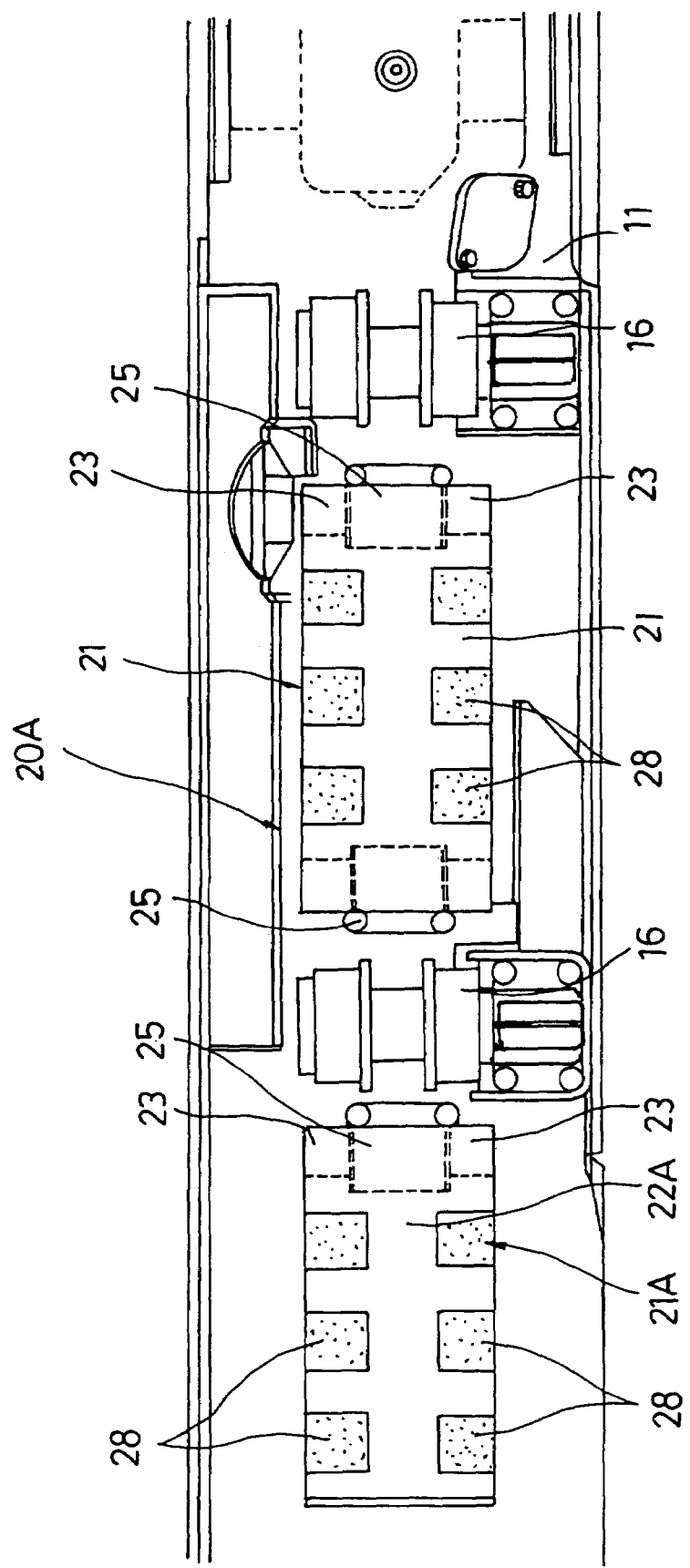
FIG. 7 is a top plan view of the system in FIG. 6.

FIG. 6 is a side view of a crawler belt link grinding system in accordance with a third exemplary embodiment of the present invention, and FIG. 7 is a top plan view of the system in FIG. 6.

In addition to abrasive plate 21 mentioned earlier, crawler belt link grinding system 20A of the present embodiment includes another abrasive plate 21A near idler 13. This abrasive plate 21A is basically similar in structure to above-described abrasive plate 21 except that this plate 21A has a somewhat different support structure. Accordingly, the following description refers to only those different in structure from those of the foregoing embodiments. Elements similar to those in the foregoing embodiments have the same reference marks, and the detailed descriptions of those elements are omitted.

In abrasive plate 21A, base frame 22A having a required size has one end along a traveling direction, and base end bosses 23 are attached to this end. Base frame 22A is supported above track frame 11 by passing mounting shaft 26 through mounting bracket 25 in the same manner as described earlier. Abrasive layers 28 formed on a top surface of base frame 22A are so disposed that tread 14b of crawler belt link 14a of crawler belt 14 that slopes away from idler 13 to be passed to one of carrier rollers 16 comes into contact with these abrasive layers 28 for grinding.

In crawler belt link grinding system 20A thus constructed, the plurality of abrasive plates 21, 21A are disposed at an upper central position and an upper slanting position, respectively, thus performing further correction through grinding. Abrasive plate 21A provided at the slanting position also serves as a guide for retaining tension by preventing the slack of crawler belt 14 between idler 13 and carrier roller 16. When abrasive plate 21A at the slanting position is put out of use, abrasive plate 21A can be brought out of contact with crawler belt link 14a by rotating mounting shaft 26 at a shaft supporting part. Using an eccentric shaft as mounting shaft 26 as described earlier allows withdrawal of abrasive plate 21A from a grinding position through the same operation and also allows adjustment to the grinding position.

(FOURTH EMBODIMENT)

Figure 8:
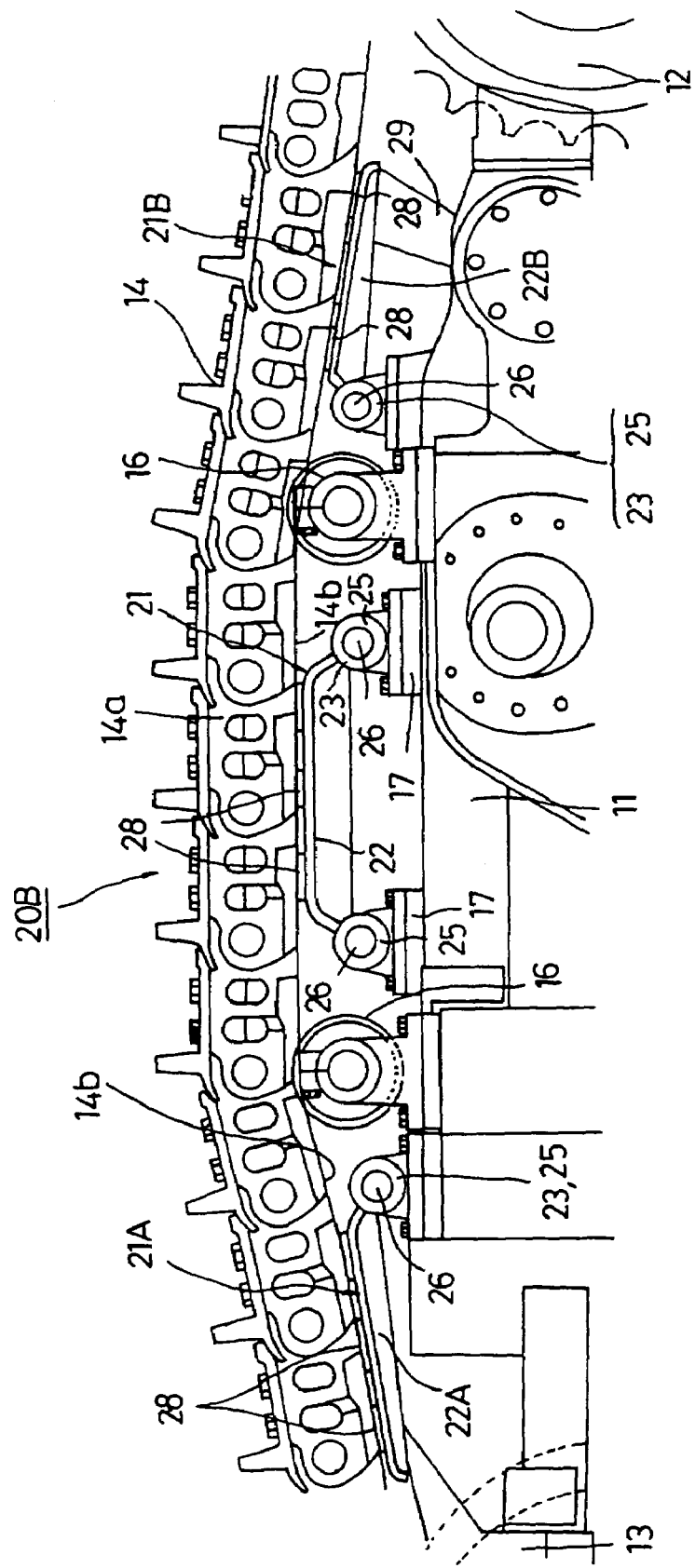
FIG. 8 is a side view of a crawler belt link grinding system in accordance with a fourth exemplary embodiment of the present invention.

FIG. 8 is a side view of a crawler belt link grinding system in accordance with a fourth exemplary embodiment of the present invention.

In addition to earlier-described abrasive plate 21 disposed above a central portion of track frame 11, crawler belt link grinding system 20B of the present embodiment includes abrasive plate 21A disposed between front carrier roller 16 and idler 13 and abrasive plate 21B disposed between rear carrier roller 16 and sprocket 12. These abrasive plates 21A, 21B are provided at respective portions where wound crawler belt 14 slopes. As in the case of the third embodiment, abrasive plates 21A, 21B each have base end bosses 23 at one base end, and these base end bosses 23 and mounting bracket 25 are supported by mounting shaft 26. Accordingly, the following description refers to only those different from those of the foregoing embodiments. Elements similar to those in the foregoing embodiments have the same reference marks, and the descriptions of those elements are omitted.

In crawler belt link grinding system 20B of this embodiment, abrasive plate 21B having a required size is disposed at the portion, where the crawler belt is stretched from sprocket 12 in a sloping condition, so as to correspond to the slope. In other words, base frame 22B having the required size has the end along a traveling direction that is attached to base end bosses 23, is supported above track frame 11 by passing mounting shaft 26 through mounting bracket 25 in the same manner as described earlier, and has the other end supported from below by being connected to track frame 11 by auxiliary support piece 29. Except for the above, abrasive plate 21B is similar in structure to abrasive plate 21A.

In crawler belt link grinding system 20B thus constructed, the plurality of abrasive plates 21, 21A, 21B are disposed substantially above the entire section of a non-ground-contact side of crawler belt 14 between idler 13 and sprocket 12, so that treads 14b of crawler belt links 14a are ground by sliding friction against abrasive layers 28 of abrasive plates 21, 21A, 21B while being held under tension associated with the movement of crawler belt 14. Consequently, uneven wear can be prevented promptly from taking place. If grinding speed increases, for example, all the abrasive plates may be removed, or one or two of the abrasive plates may selectively be left for operation. Abrasive plates 21A, 21B located at the respective slanting positions also serve as guides-for retaining the tension by preventing the slack of crawler belt 14 when used.

(FIFTH EMBODIMENT)

FIGS. 9(*a*) and 9(*b*) are respective top plan and side views of a crawler belt link grinding system in accordance with a fifth exemplary embodiment of the present invention.

Crawler belt link grinding system 20C of the present embodiment is basically similar to that of the first embodiment except that its abrasive plate 21C has a different support structure. Originally, two carrier rollers 16 are provided above track frame 11. However, mounting bracket 25C is provided in place of one of these rollers 16 for abrasive plate 21C. This mounting bracket 25C supports an end of support shaft 32 passing through boss 31 provided to the center of a bottom surface of base frame 22C having a required size, and abrasive plate 21C is disposed to contact respective treads 14b of crawler belt links 14a of wound crawler belt 14.

For grinding by contact with treads 14b of side-by-side crawler belt links 14a, a top surface of base frame 22C is formed to have rough surfaces by overlaying the same super hard material as that of earlier-described abrasive plate 21 that includes the material having the cemented carbide particles dispersed therein. In this embodiment, abrasive layers 28' are not provided in blocks, but are provided to extend substantially throughout the entire length of base frame 22C. Abrasive layer 28' extends to a curved portion located at each end of frame 22C, so that tread 14b of crawler belt link 14a undergoes grinding reasonably from a position where this tread 14b comes into contact with that abrasive layer 28' for the first time. However, the abrasive layers are not limited to this arrangement and can be arranged in blocks as described earlier.

Similarly to the crawler belt link grinding system of each of the foregoing embodiments, crawler belt link grinding system 20C of the present embodiment is such that traveling crawler belt link 14a is ground by grazing abrasive layer 28'. When this system 20C is put out of use, this system 20C can be removed or can be brought out of contact by, for example, forming support shaft 32 into an eccentric shaft described earlier and displacing system 20C downward from a grinding position (position of the treads of the moving crawler belt links) by the amount of eccentricity.

(SIXTH EMBODIMENT)

Figure 10:
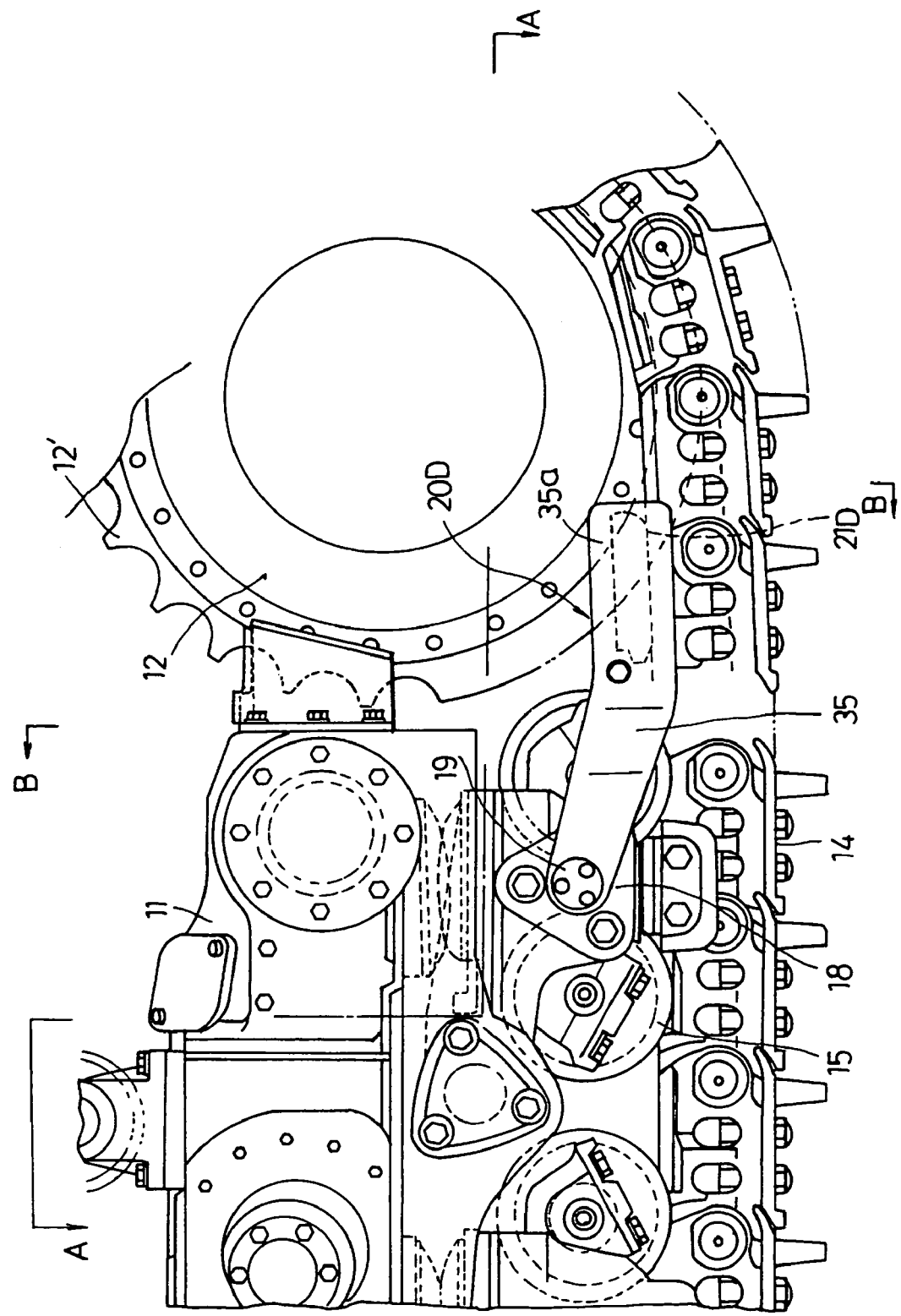
FIG. 10 is a side view of a crawler belt link grinding system in accordance with a sixth exemplary embodiment of the present invention.
Figure 11:
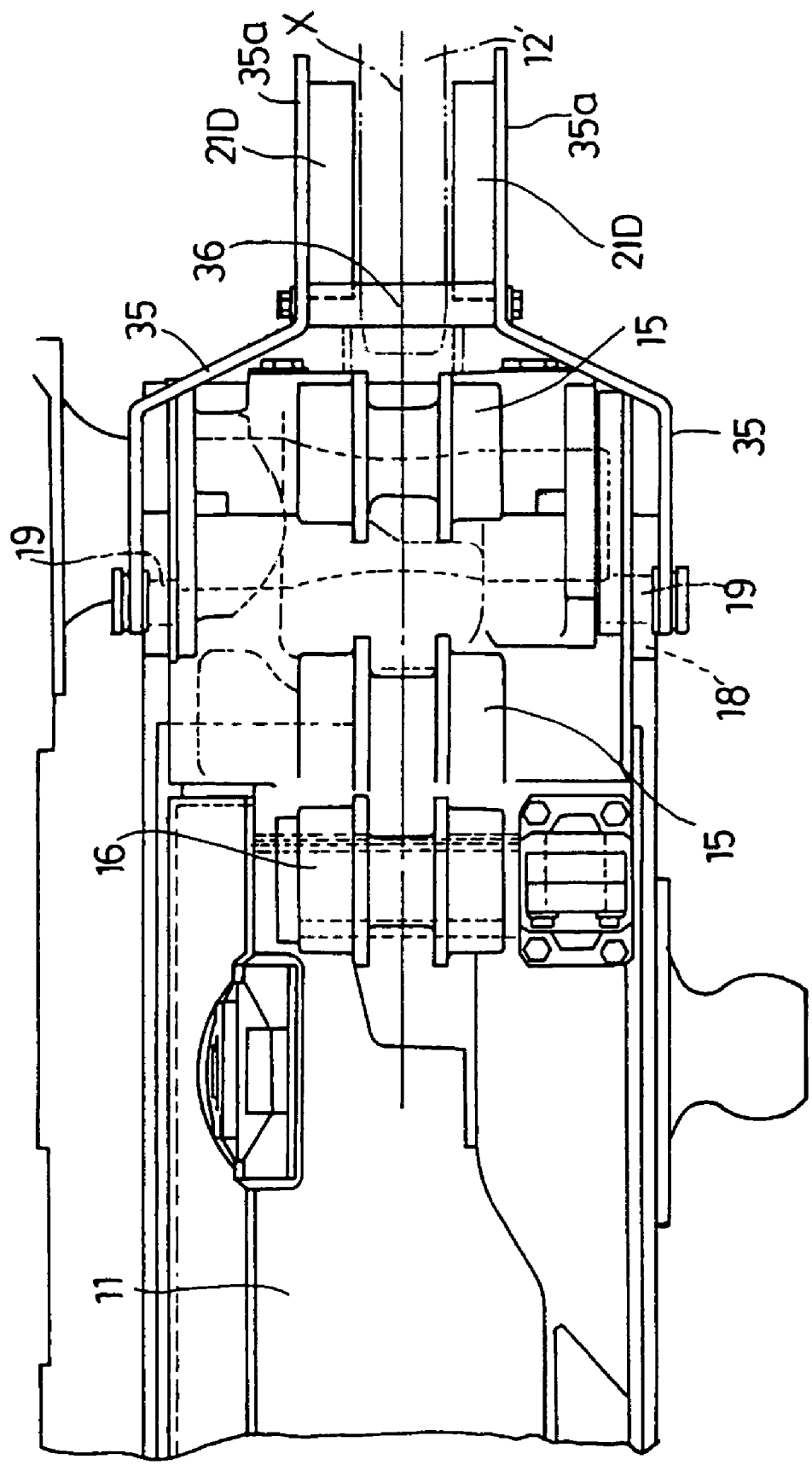
FIG. 11 is a view taken along line A—A of FIG. 10.
Figure 12:
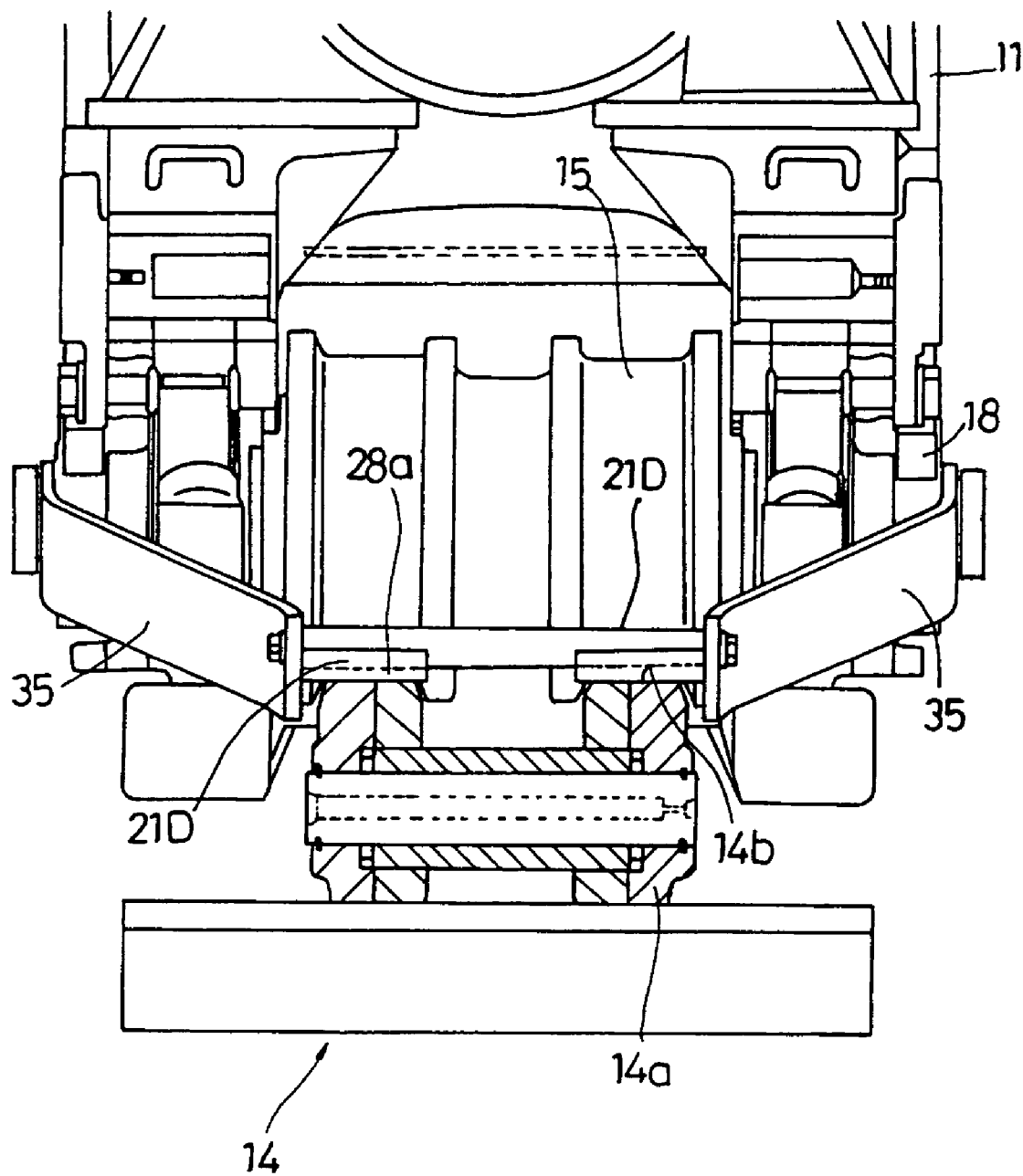
FIG. 12 is a view taken along line B—B of FIG. 10.

In each of the foregoing embodiments, the crawler belt link grinding system having the abrasive plate disposed above track frame 11 has been described. In a sixth exemplary embodiment of the present invention, an abrasive plate is disposed below track frame 11. FIG. 10 is a side view of a crawler belt link grinding system in accordance with the present embodiment. FIGS. 11 and 12 are views taken along respective lines A—A and B—B of FIG. 10.

Crawler belt link grinding system 20D of this embodiment is constructed to include two separate abrasive plates 21D facing each other across traveling centerline X of crawler belt links 14a. These abrasive plates 21D are disposed at a front position (left position in the drawing) of sprocket 12 of a crawler structure to correspond to respective crawler belt link treads 14b of crawler belt 14.

Each abrasive plate 21D includes a rectangular base member secured to an inner periphery of leading end part 35a of support arm (support member) 35, and is disposed to contact tread 14b of crawler belt link 14a of crawler belt 14 moving on a ground-contact side to be wound around sprocket member 12' of sprocket 12. Support arm 35 has a base end attached to an outer end of pivot shaft 19 of bogie 18 supporting track roller 15. The pair of left and right support arms 35 supporting abrasive plates 21D are each shaped to bend inwardly toward traveling centerline X of crawler belt 14 at its intermediate section and to extend from the base end to the part secured to abrasive plate 21D, are disposed to be symmetrical with respect to traveling centerline X and are coupled together by stay bolt 36 at the parts secured to the respective abrasive plates so as to face each other across a specified spacing.

Abrasive plates 21D of crawler belt link grinding system 20D thus constructed are formed into two left and right separate pieces so as not to contact sprocket member 12' of sprocket 12, and are each equipped with abrasive layer 28a at a surface facing tread 14b of crawler belt link 14a. Abrasive layer 28a is formed by overlaying super hard material including material having cemented carbide particles dispersed therein in the same manner as in the foregoing embodiments. Abrasive plates 21D are provided in a space formed between a position before a position where crawler belt 14 winds around sprocket member 12' of sprocket 12 and track roller 15 so as to perform grinding during travel in the same manner as the abrasive plate located above track frame 11.

Abrasive plates 21D disposed in the above-mentioned position not only prevents uneven wear by grinding but also suppress rising of crawler belt 14 moving in a feeding direction on the ground-contact side between sprocket member 12' of sprocket 12 and track roller 15, thereby preventing irregular load from acting on crawler belt links 14a. When crawler belt link 14a requires no grinding for correction, abrasive plate 21D can be removed by detaching the base end of support arm 35 from pivot shaft 19 and disconnecting stay bolt 36. Thus, resistance caused by grinding is eliminated.

Abrasive plates 21D of crawler belt link grinding system 20D may arbitrarily be disposed near idler 13 on an as needed basis. Although support arm 35 is supported at bogie 18, this arm 35 may be supported at track frame 11. In that case, support arm 35 may be supported, for example, via a mounting seat and a mounting bracket as described in the foregoing embodiments or may be supported directly by track frame 11.

The above description has referred to the embodiments individually. However, the abrasive layers of the abrasive plate may arbitrarily be arranged, for example, in blocks or continuously on an as needed basis. The cantilever structure can be replaced by a structure having both ends supported. Instead of being formed by overlaying the hard material, the abrasive layer of the abrasive plate can be, for example, a fixed structure that has filing meshes made of hard material.

What is claimed is:

1. A crawler belt link grinding system comprising:
   an abrasive plate positioned so as to contact a wound crawler belt to grind treads of links of the crawler belt;
   wherein the abrasive plate has a width that is larger than an outside width of the links and a length that is longer than one pitch of the links;
   wherein the abrasive plate comprises a base frame and at least one abrasive portion provided on a surface of the base frame; and
   wherein each said abrasive portion comprises a plurality of alternating ridges and grooves extending along a direction crossing a traveling direction of the links.

2. The crawler belt link grinding system of claim 1, wherein the crawler belt is wound around an idler and sprocket positioned at ends of a track frame, and the abrasive plate is disposed above the track frame.

3. The crawler belt link grinding system of claim 1, wherein the crawler belt is wound around an idler and sprocket positioned at ends of a track frame, and the abrasive plate is disposed below a rear portion of the track frame and is supported by a support member coupled to a bogie supporting a track roller.

4. The crawler belt link grinding system of claim 1, wherein the crawler belt is wound around an idler and sprocket positioned at ends of a track frame, and the abrasive plate is supported by a support member coupled to a rear portion of a bottom side of the track frame.

5. The crawler belt link grinding system of claim 2, wherein the abrasive plate is mounted be movable away from a grinding position.

6. The crawler belt link grinding system of claim 5, wherein a distance between the abrasive plate and the crawler belt is adjustable.

7. A crawler structure comprising:
   a track frame;
   a sprocket disposed at one side of said track frame;
   an idler disposed at another side of said track frame;
   a track roller disposed under said track frame;
   a carrier roller disposed on said track frame;
   an endless crawler belt wound between the sprocket and the idler, said crawler belt including crawler belt links, which have respective treads that are in rolling contact with the track roller, the carrier roller and the idler during travel; and
   a crawler belt link grinding system, including an abrasive plate, for grinding the respective treads of the crawler belt links of the crawler belt;
   wherein the abrasive plate comprises a base frame and at least one abrasive portion provided on a surface of the base frame; and
   wherein each said abrasive portion comprises a plurality of alternating ridges and grooves extending along a direction crossing a traveling direction of the links.

8. The crawler structure of claim 7, wherein the crawler belt link grinding system is supported at the track frame and grinds the respective treads of the crawler belt links on at least one of a non-ground-contact side and a ground-contact side of the crawler belt.

9. The crawler belt link grinding system of claim 3, wherein the abrasive plate is detachably mounted at a grinding position.

10. The crawler belt link grinding system of claim 9, wherein a distance between the abrasive plate and the crawler belt is adjustable.

11. The crawler belt link grinding system of claim 4, wherein the abrasive plate is detachably mounted at a grinding position.

12. The crawler belt link grinding system of claim 11, wherein a distance between the abrasive plate and the crawler belt is adjustable.

13. The crawler structure of claim 7, wherein the abrasive plate is detachable from the grinding position.

14. The crawler belt link grinding system of claim 5, wherein the abrasive plate can be withdrawn from the grinding position.

15. The crawler belt link grinding system of claim 1, wherein the at least one abrasive portion comprises a plurality of abrasive portions having spaces therebetween.

16. The crawler structure of claim 7, wherein the base frame has a width that is larger than an outside width of the links and has a length that is longer than one pitch of the links.

17. A crawler structure comprising:
    a track frame;
    a sprocket disposed at one side of said track frame;
    an idler disposed at another side of said track frame;
    a track roller disposed under said track frame;
    a carrier roller disposed on said track frame;
    an endless crawler belt wound between the sprocket and the idler, said crawler belt including crawler belt links, which have respective treads that are in rolling contact with the track roller, the carrier roller and the idler during travel; and
    a crawler belt link grinding system, including an abrasive plate, for grinding the respective treads of the crawler belt links of the crawler belt;
    wherein the abrasive plate comprises a base frame and at least one abrasive portion provided on a surface of the base frame; and
    wherein the at least one abrasive portion comprises a plurality of abrasive portions having spaces therebetween.

* * * * *